(No Model.)

W. SEATON.
FISH TRAP.

No. 521,053.    Patented June 5, 1894.

WITNESSES
M. W. Twitchell
May E. Moore

INVENTOR
William Seaton
by Wm. Moore
Attorney

UNITED STATES PATENT OFFICE.

WILLIAM SEATON, OF GREENFIELD, ASSIGNOR OF ONE-HALF TO I. R. COLE, OF HARRISBURG, ARKANSAS.

FISH-TRAP.

SPECIFICATION forming part of Letters Patent No. 521,053, dated June 5, 1894.

Application filed January 11, 1894. Serial No. 496,535. (No model.)

*To all whom it may concern:*

Be it known that I, WILLIAM SEATON, a citizen of the United States, residing at Greenfield, in the county of Poinsett and State of Arkansas, have invented certain new and useful Improvements in Fish-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in traps, which while specially adapted for trapping fish may be employed for trapping birds or other animals where it could be effectively and advantageously employed.

The object of my invention is the production of a trap of the character and for the purpose named which will be of comparatively simple and inexpensive construction and which will be thoroughly efficient for the intended purpose.

The invention consists of a trap embodying a novel arrangement and combination of parts whereby an effective and useful trap is provided as will appear from the following disclosure.

Figure 1:
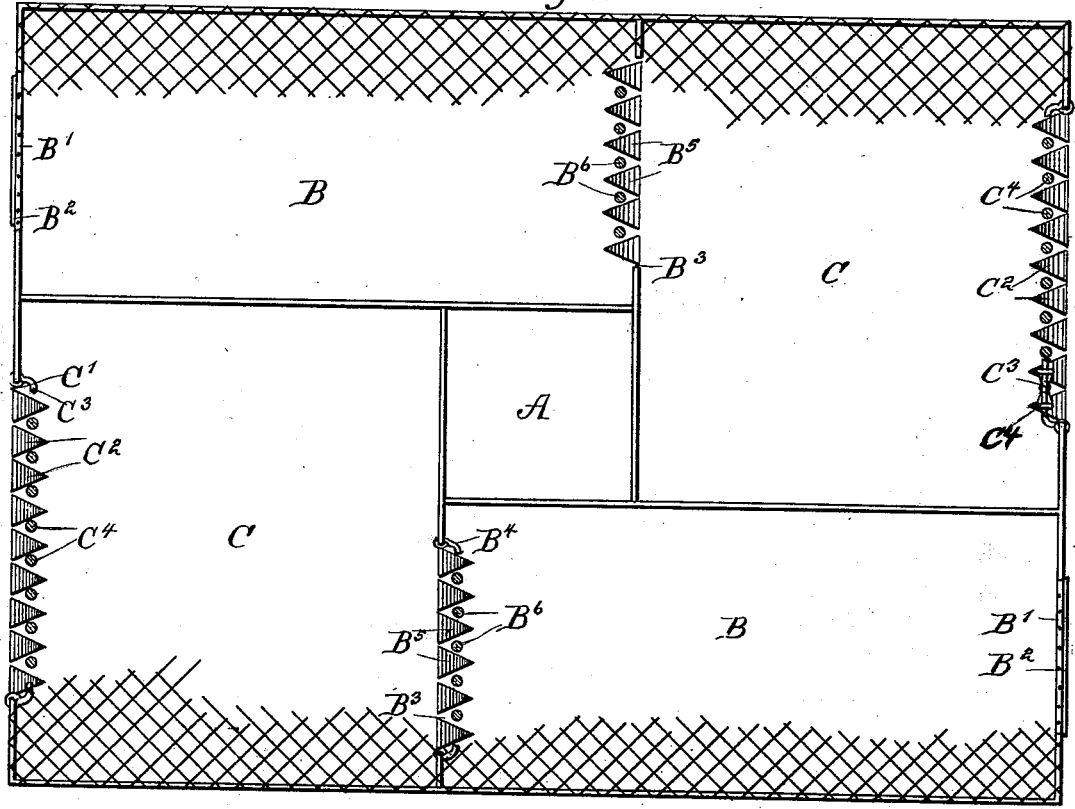
Figure 2:
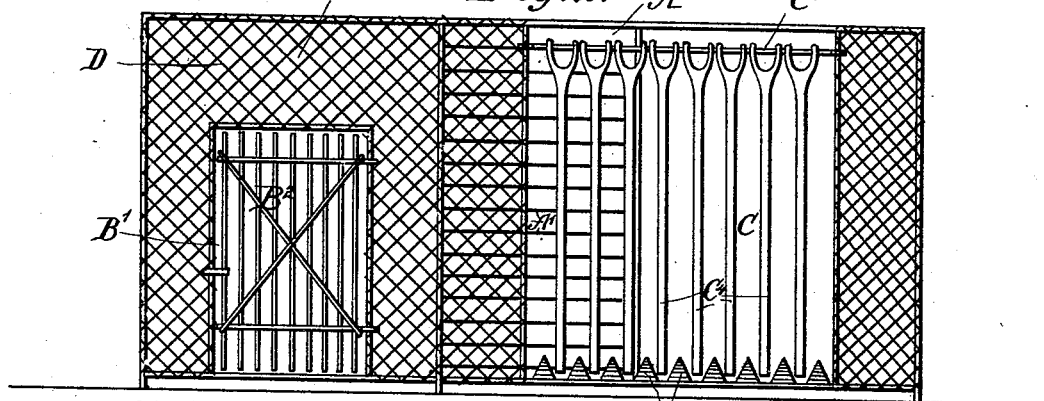

Figure 1 represents a plan view of my improved trap. Fig. 2 represents an end elevation.

My improved trap is in the general form of a rectangle or of a square and consists of the square central arranged bait box or receptacle A, the two oblong receptacles or prisons B, and the two substantially square receptacles or prisons C, which are arranged as shown with reference to each other and the outer walls of the trap are preferably made of open or net work D, the meshes of which are the proper size to prevent the escape of the fish or animals therefrom.

The two oblong prisons B are provided in their outer walls with the openings B' provided with doors B², preferably made of vertical parallel bars and the doors are hinged and provided with suitable fastenings and these openings are what I term outlets as when the trap is placed in the water the water flows out through the said openings. The inner walls of the oblong prisons are provided with openings B³, having at their upper portion the rod B⁴, and at the lower portion the lips B⁵ which are turned upward and to the bar and adjacent to said lips are secured the vertical rods B⁶ and these form the inside openings or entrances to the bait box.

The prisons or receptacles C are provided with the outside openings or entrances C', in which are arranged the lips C², and the rod C³, and between the lips and to the rod are secured the inward swinging vertical bars C⁴.

The bait box or receptacle is preferable inclosed by walls made of horizontal parallel arranged bars A' which permit the fish to pass between the bars into the box and which also allow the water to flow through the same.

In practice the trap when used for trapping fish is placed in the water and anchored the proper distance below the surface with the outlets of the oblong prisons in the way of the current and the fish enter the doors of the square prisons and from thence pass through the inside doors of the oblong prisons or they can pass directly into the bait box from the square prisons and while the fish have access to all parts of the trap they cannot escape after once entering and the lips and forks at the entrance openings serve to prevent the fish from passing out.

It will be seen that I provide a simple, inexpensive and practical trap which will prove useful in catching fish or other animals.

I claim—

1. The herein described trap, consisting of the central arranged square bait box, the corner square compartments having the openings, the inward swinging rods arranged in said openings, the guards secured at the lower ends of the rods and the oblong corner compartments each having an outlet opening, the whole trap being of rectangular shape.

2. A fish trap consisting of the central or bait compartment, the compartments surrounding the bait compartment and having openings or passages, the plates secured in the passages of the compartments having the inturned barbed or pointed lips, the inward swinging rods in the passages above said
5 plates and the bars secured to the said plates and rods; the whole forming a barrier to prevent the fish from passing out from the trap.

In testimony whereof I affix my signature in presence of two witnesses.

WILLIAM SEATON.

Witnesses:
  L. C. GOING,
  A. A. COPPAGE.